United States Patent Office
3,165,498
Patented Jan. 12, 1965

3,165,498
NOVEL POLYMERS OF UNSATURATED
CARBAMATES
William E. Bissinger, Akron, Ohio, assignor, by mesne
assignments, to Pittsburgh Plate Glass Company
No Drawing. Filed Apr. 27, 1960, Ser. No. 24,904
5 Claims. (Cl. 260—67)

This invention deals with novel polymers and their preparation. It more particularly concerns polymers typified by copolymers of olefinically unsaturated carbamates and olefins such as ethylene which have a plurality of carbamate groups.

In accordance with this invention, novel polyfunctional interpolymers are provided which have a multiplicity of reactive carbamate groups, usually upwards of two and often ten or sometimes even fifteen or more. Such polycarbamates are principally linear, having as their principal linear structure a carbon chain. This linear carbon chain includes carbon atoms to which the reactive carbamate groups are linked through recurring methylene groups. That is, a characteristic of these polymers is the presence of recurring methylcarbamate pendant groups

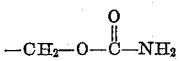

These polycarbamate polymers are convertible into three-dimensional, thermosetting, cross-linked polymers by reaction of one or more of their carbamate groups with aldehydes. Thus, by condensation with formaldehyde or other aldehydes, these polycarbamate polymers are transformed ultimately into hard, chemically resistant products. One asset of the contemplated polycarbamates is that by condensation with aldehydes, such as formaldehyde, intermediate polymers having a plurality of groups

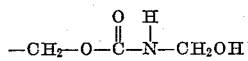

are formed.

Such intermediate polymers are convertible to hard, three-dimensional, thermosetting, cross-linked polymeric products by self-condensation of these groups in a plurality of polymer chains. Heating with or without a catalyst may be used to facilitate this condensation of the methylol groups.

The resulting three-dimensional polymers obtained by condensation of the contemplated polycarbamate polymers are useful in providing strongly adhering, tough, chemically resistant surface finishes. Thus, they are useful for protectively coating various surfaces such as wood, metal including iron, copper and steel, natural and synthetic cellulosic sheeted and woven materials, including paper, cotton textiles and the like. A variety of expedients may serve to provide the coatings. In a typical one, the intermediate polymer (the initial condensation product of the polycarbamate and formaldehyde) is applied to the surface (usually in a volatile solvent), following which the resulting surface is baked at elevated temeperatures to volatilize any solvent and effect condensation of methylol groups. This gives rise to a surface coating of a thermoset, cross-linked polymer.

According to one embodiment hereof, the polycarbamate interpolymers of allyl carbamate and ethylene comprise the preferred interpolymers. Most of these interpolymers contain from about 5 to 85 percent allyl carbamate by weight. Their molecular weights are usually on the order of 400 to 3000 in molecular weight.

These polycarbamate interpolymers of ethylene and allyl carbamate are sticky or waxy solids of limited solubility in cold benzene or cold dioxane. Their solubility in solvent such as benzene or dioxane increases with temperature.

Allyl carbamate-ethylene interpolymers are principally linear in character, having as their principal linear configuration a carbon chain containing recurring pendant methylcarbamate groups

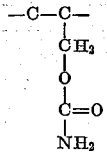

Many of these interpolymers contain three or more such pendant methylcarbamate groups. By reaction with aldehydes such as formaldehyde, these interpolymers may be converted into three-dimensional, thermosetting products.

For example, formaldehyde may be condensed with the interpolymers (and more specifically condensed with pendant methylcarbamate groups) to form initially intermediate polymers having a plurality of methylol groups representable by the formula:

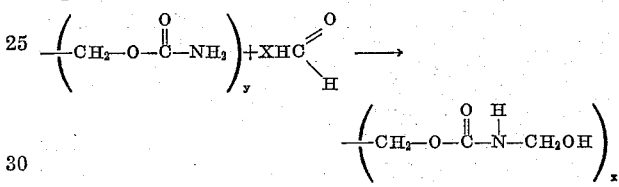

$x$ denoting the number of pendant recurring methylcarbamate groups in the linear interpolymer.

Heating at elevated temperatures of 100° C. to 250° C. for reasonable periods of time, say 30 minutes, causes condensation between methylol groups (from different chains) thus leading to three-dimensional, thermoset polymers.

Condensation products of the contemplated polycarbamate interpolymers with aldehydes other than formaldehyde include those produced by condensation with aliphatic aldehydes of up to 12 carbons such as acetaldehyde, propionaldehyde, n-butyraldehyde, isobutyraldehyde, n-valeraldehyde, n-caproaldehyde and the like.

Condensation products of the contemplated polycarbapolymers with olefinically unsaturated aldehydes such as acrolein or crotonaldehyde form polymers having mixed polyfunctionality, e.g., both olefinic unsaturation as well as alkylol groups. Conversion of such polymers of mixed functionality may be either by condensation of their alkylol groups as in the manner indicated with formaldehyde or may be by polymerization via their olefinic unsaturation according to recognized expedients for effectuating polymerization through the use of olefinic unsaturation.

Interpolymers here contemplated including the preferred interpolymers of ethylene and allyl carbamate may be prepared by recourse to several methods. In one, allyl chloroformate and ethylene may be interpolymerized in the liquid phase using a peroxy catalyst and superatmospheric pressure to provide a polychloroformate according to the method described in my application Serial No. 18,510, filed March 30, 1960, entitled "Polychloroformates," and the resulting polychloroformates converted to the contemplated polycarbamates by ammonolysis. However, in the preferred method of preparation, the contemplated interpolymers of ethylene and allyl carbamate are interpolymerized. In other words, it is better to convert allyl chloroformate to allyl carbamate.

The interpolymerization of ethylene and allyl carbamate proceeds best in a liquid reaction medium under pressure and with the aid of a catalyst such as diisopropyl peroxydicarbonate or like esters such as are described in United States Patent 2,370,588, granted February 27, 1945. Olefins such as ethylene are normally gaseous; hence, copolymerization is conducted in a liquid medium provided by recourse to a liquid diluent in which the olefin is sufficiently soluble and is dissolved.

The following example illustrates the preparation of polycarbamate interpolymers from ethylene and allyl carbamate:

EXAMPLE I

A series of ethylene-allyl carbamate interpolymers are prepared by mixing in the amounts specified in Table I allyl carbamate, thiophene-free anhydrous benzene and diisopropyl peroxydicarbonate in a glass-lined autoclave having a capacity of 1000 milliliters and a liner of 600 milliliters. The charged autoclave is flushed twice with ethylene (99.5 percent by weight pure) to displace air, following which it is filled with ethylene at full cylinder pressure at room temperature while rocking.

After the autoclave contents are saturated with ethylene, the autoclave temperature is raised gradually to about 50° C. over a period of about 3 hours. The initial pressure in the autoclave is as indicated in Table I. As the formation of polycarbamate proceeds, the pressure decreases whereupon more ethylene is added until such time as the pressure falls below the initial gauge pressure. When no further decrease in pressure occurs, the autoclave contents are allowed to cool and the polycarbamate product is recovered by removing solvent, unreacted monomer and other components by heating the reaction mixture to 140° C. under 8 millimeters mercury pressure.

The following Table I lists the details of the various preparations of copolymers in accordance with the foregoing procedure:

combined, dried over anhydrous calcium chloride, and the methylene chloride removed under nitrogen by heating the solution up to 80° C. under 25 millimeters of mercury vacuum.

The resulting liquid residue is fractionally distilled under nitrogen through a packed column to provide purified allyl carbamate.

The following example illustrates the preparation of polycarbamate interpolymers by ammonolysis of polychloroformate interpolymers:

EXAMPLE II

A mixture of 40.6 milliliters (0.6 mole) of ammonium hydroxide and 50 milliliters of methylene chloride is cooled to minus 5° C. in an ice-salt bath and vigorously agitated. To this mixture some 63.2 grams (0.029 mole) of a polychloroformate interpolymer having an average of 6.7 chloroformate groups per chain of ethylene and allyl chloroformate (2190 cyoscopic molecular weight, chloroformate chlorine content of 10.8 weight percent) dissolved in 230 milliliters of methylene chloride is added in small increments while maintaining the reaction mixture below 2° C. Some 1.5 hours are required. Thereafter, agitation is continued for 1.25 hours at 0° C. and then for 2.5 hours at 25° C. The resulting mixture is then shaken with 170 milliliters of water and 50 milliliters of methylene chloride and an emulsion forms. Additional methylene chloride and water are added and the mixture boiled to break the emulsion. The procedure is then repeated and the organic layers combined and dried over anhydrous sulfate. Solvent is removed by heating the solution under nitrogen to 65° C. and at 5 millimeters of mercury pressure. A tough, yellow, solid polycarbamate having a molecular weight of 1110 and contain-

*Table I*

| Preparations | Charge | | | Gauge Pressure, pounds per square inch | | Temp., °C. | Product | | | | |
|---|---|---|---|---|---|---|---|---|---|---|---|
| | ACM,[1] grams | IPP,[2] grams | Benzene, milliliters | Initial | Maximum | | Yield, grams | Analysis, weight percent | | Molecular Weight | Weight percent ACM[1] in Polymer |
| | | | | | | | | N | $CO_2$ | | |
| A [3] | 19 0 | 2.2 | 72 | 570 | 730 | 52 | 24.0 | 6.93 | 23.1 | 593 | 50.0 |
| B | 59.1 | 6.8 | 224 | 775 | 1,000 | 50 | 98.4 | 4.91 | 18.5 | 1,075 | 35.4 |
| C | 20.1 | 4.8 | 261 | 700 | 900 | 50 | 70.6 | 3.20 | 11.0 | 870 | 23.1 |
| D | 14.8 | 4.8 | 266 | 700 | 850 | 50 | 61.0 | 1.85 | 6.8 | 1,400 | 13.4 |
| E | 11.6 | 4.8 | 269 | 700 | 850 | 50 | 65.9 | 1.51 | 7.4 | 1,440 | 10.9 |

[1] ACM denotes allyl carbamate.
[2] IPP denotes isopropyl peroxydicarbonate.
[3] Autoclave capacity is 300 milliliters and liner capacity is 180 milliliters.

The polycarbamates of preparations A through E are mainly pale yellow sticky rather tough waxy solids having only very limited solubility in cold benzene, toluene, dioxane or acetone. However, these polycarbamate interpolymers are more soluble in hot benzene, toluene or butanol.

Allyl carbamate of Example I hereof is prepared by adding to 202.9 milliliters of aqueous ammonia containing 51 grams of ammonia at 0° C. some 160.5 grams of allyl chloroformate (93.2 percent by weight pure) while vigorously stirring the reaction medium. This allyl chloroformate is added at a rate such that the temperature of the reaction medium does not rise about 10° C. Some 2 hours are required to add the allyl chloroformate. Following this addition, stirring is continued at 0° C. for an additional hour whereafter the reaction mixture is warmed to room tempertaure, while stirring, over a period of 2 hours.

The resulting mixture is treated with 75 milliliters of water to dissolve ammonium chloride and then extracted successively with 110 milliliters and 40 milliliters of methylene chloride. The methylene chloride extracts are ing by analysis 4.29 percent by weight nitrogen is obtained.

In lieu of or in admixture with allyl carbamate other unsaturated carbamates serve to prepare polycarbamate interpolymers according to the method described in Example I. Thus, chloroformates of other unsaturated alcohols other than allyl chloroformate may be converted to olefinically unsaturated carbamates and used to prepare contemplated interpolymers. Among such chloroformates are the chloroformates of vinyl alcohol, 1-butene-4-ol, 2-butene-1-ol; methylvinylcarbinol, ethylvinylcarbinol, dimethylpropylcarbinol, beta-allylethyl alcohol, allylmethylcarbinol, cyclopentene-3-ol, cyclohexene-3-ol, and like olefinically unsaturated alcohols, including methallyl alcohol, chlorallyl alcohol, and 1-chlorobutene-3-ol-2. By following the process described in United States Letters Patent 2,476,637, granted July 19, 1949, most if not all chloroformates of these and other useful unsaturated alcohols may be prepared. These chloroformates are converted by ammonolysis in aqueous liquid media to their corresponding olefinically unsaturated carbamates. Useful unsaturated carbamates thus are derived from unsaturated alcohols having a polymerizable unsaturated group, preferably olefinic unsaturation, and an alcoholic hydroxyl group attached to an aliphatic carbon.

Contemplated are interpolymers of unsaturated carbamates and olefinically unsaturated hydrocarbons or chlorohydrocarbons other than ethylene. Thus, ethylene may be partially or completely replaced by propylene, butadiene, butene-1, butene-2, isobutylene, pentene-1, 2-methylbutene-1, hexene-1, octene-1, styrene, acrylonitrile, and the like.

Polycarbamate interpolymers containing high chlorine or halogen contents which evidence greater flame resistance are contemplated. For example, they are provided by interpolymerizing unsaturated carbamates with olefinically unsaturated halohydrocarbons including mixed halohydrocarbons, e.g., chlorofluorohydrocarbons, in lieu of unsaturated hydrocarbons such as ethylene. A typical olefinic halohydrocarbon is trichloroethylene. Others include the dichloroethylenes (cis and trans), 1,1-dichloro-2 - fluoroethylene, 3,3,3-trichloro-1-propene, 1,2-difluoroethylene, and longer chain halohydrocarbons, usually including those having up to eight aliphatic carbons.

The following example illustrates the preparation of interpolymers of an olefinic chlorohydrocarbon and an olefinically unsaturated carbamate:

EXAMPLE III

Some 41.3 grams of trichloroethylene, 21.1 grams of allyl carbamate, and 1.2 grams of diisopropyl peroxydicarbonate are charged to a round-bottom flask fitted with a condenser closed with a vent. The flask is then flushed with nitrogen and heated at 45° C. for 90 hours. Unreacted monomer is separated from the reaction product by vacuum distillation under nitrogen at pot temperatures of 130° C. at 4 millimeters mercury pressure, leaving 26.9 grams of a brown, somewhat brittle, solid polycarbamate containing a substantial chlorine content.

This polycarbamate polymer contains 39.9 percent by weight trichloroethylene and 56.9 percent allyl carbamate by weight. It is insoluble in boiling benzene and in boiling perchloroethylene, but slightly soluble in boiling ethanol and acetone.

As indicated by the details set forth in the experiments, interpolymerization of allyl carbamate and ethylene or comparable olefinically unsaturated carbamates and olefins is initiated by recourse to catalysts exemplified by isopropyl peroxydicarbonate. Other free radical initiators such as benzoyl chloride, azoisobutyronitrile, acetyl peroxide, t-butyl peroxide, etc., also may serve to initiate reaction.

Polycarbamate interpolymers form usually with greatest facility in an organic liquid medium. Thus, the interpolymerization of the reactants is conducted in a liquid reaction medium provided by appropriate organics. Typical organics of most use are the aromatics such as benzene, toluene, and the like. However, other essentially inert organic liquids, essentially those in which the reactants are adequately soluble, including chlorinated aliphatic hydrocarbons such as methylene chloride, dichloroethane, and hydrocarbons including cyclohexane, toluene, heptane, octane, etc., are available for use.

In the interpolymerization, superatmospheric pressures prevail. Among other things, these superatmospheric pressures are usually necessary in order to insure that gaseous monomers, notably the olefin or haloolefin monomer, dissolves in the polymerization medium. Depending upon the temperature at which the polymerization is conducted, the particular solvents and particular olefins, etc., considerable variation in the superatmospheric pressure is possible. As a rule, pressures in excess of about 500 pounds per square inch and up to 5000 pounds per square inch or somewhat higher are typical of those most often encountered. Even higher pressures are not precluded, although practicalities rarely dictate recourse to unusually high temperatures usually associated with such high pressures. Typical polymerization temperatures are from 0° C. to 75° C.

This example illustrates the condensation of aldehydes with polycarbamate interpolymers:

EXAMPLE IV

Some 20 grams of the polycarbamate from preparation D of Example I are dissolved in a mixture of butanol (20 grams) and toluene (80 grams) at 80° C. To this clear solution, 8 grams of a butanol solution of formaldehyde (containing 40 weight percent formaldehyde) and 0.1 gram of maleic anhydride are added. About 3.5 grams of water are then removed by azeotroping the mixture for 2.5 hours at 100° C. to 109° C.

Upon cooling, a polymer dispersion is obtained having a solids content of about 22 weight percent. This dispersion is drawn down on a warm metal surface and then is baked at 350° F. for several hours to provide an alcohol resistant, strongly adhering, protective coating.

While the present invention has been described by reference to specific details of certain embodiments, it is to be understood that it is not intended that the invention be construed as limited to such details except insofar as they appear in the appended claims.

I claim:

1. A condensation product of an unsaturated carbamate-normally gaseous aliphatic olefin polycarbamate interpolymer and an aldehyde.

2. A condensation product of an olefinically unsaturated carbamate having two hydrogen atoms linked to its carbamate nitrogen and a normally gaseous aliphatic hydrocarbon polycarbamate interpolymer and an aldehyde.

3. A condensation product of an allyl carbamate-ethylene polycarbomate interpolymer and formaldehyde.

4. An interpolymer of an olefinically unsaturated carbamate having two hydrogen atoms linked to the carbamate nitrogen and ethylene.

5. A linear polycarbamate interpolymer of allyl carbamate and ethylene having as its principal linear structure a carbon chain to which carbon atoms of recurring methylcarbamate groups are linked.

References Cited in the file of this patent

UNITED STATES PATENTS

| 2,397,548 | Kenyon et al. | Apr. 2, 1946 |
| 2,483,194 | Gleim | Sept. 27, 1949 |
| 2,689,232 | Gerhart | Sept. 14, 1954 |
| 2,781,319 | Barnum et al. | Feb. 12, 1957 |
| 2,856,386 | Smith et al. | Oct. 14, 1958 |
| 2,865,893 | Unruh et al. | Dec. 23, 1958 |